United States Patent Office 3,257,783
Patented June 28, 1966

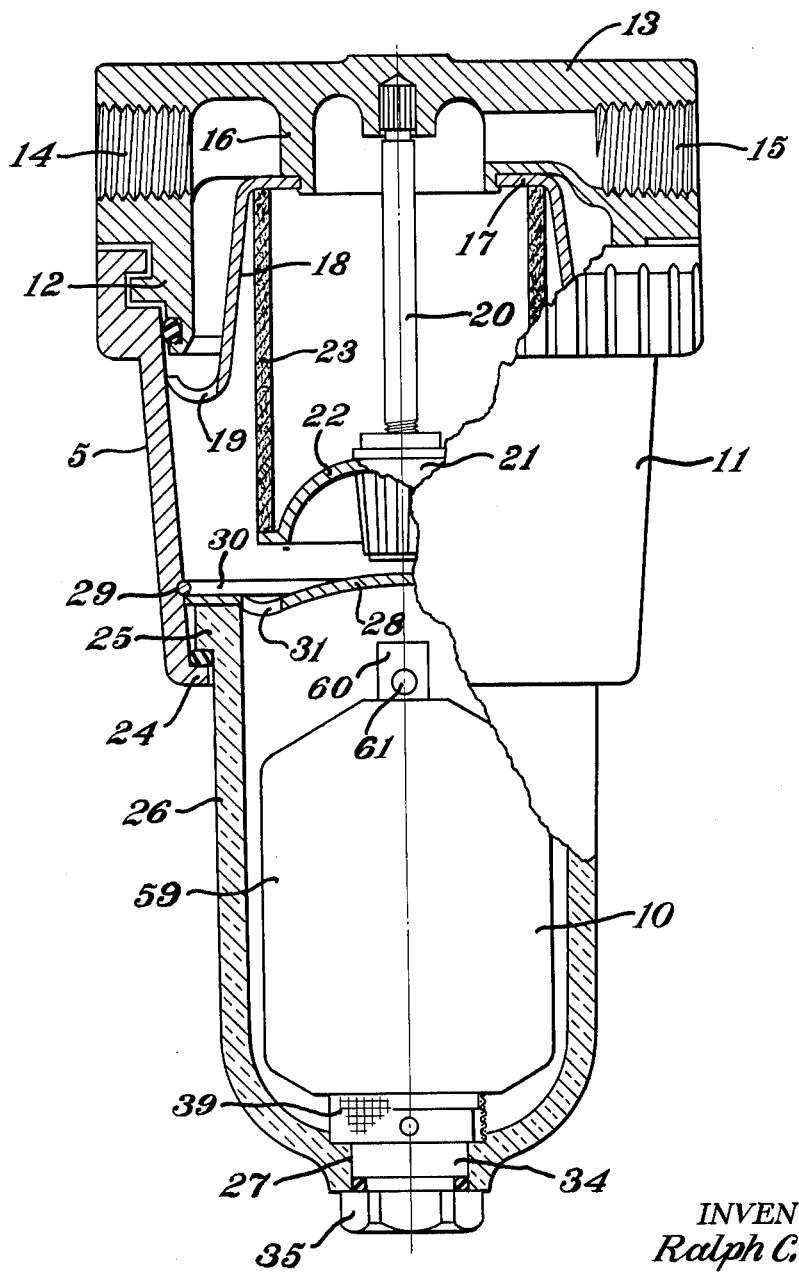

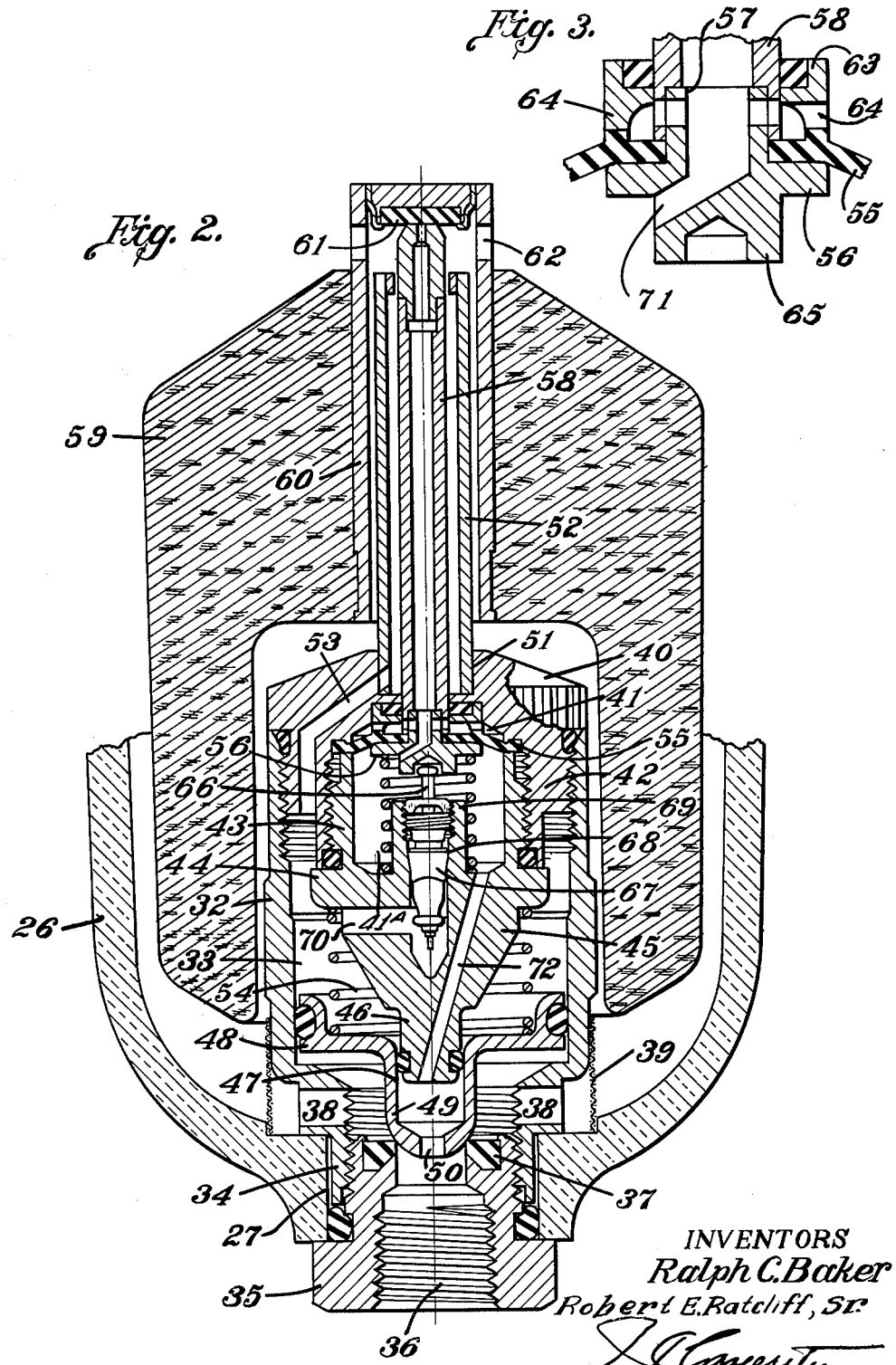

3,257,783
FILTER AND AUTOMATIC DUMP VALVE FOR PRESSURE FLUID LINES
Ralph C. Baker, Littleton, and Robert E. Ratcliff, Sr., Fort Collins, Colo., assignors to Wilkerson Corporation, Englewood, Colo., a corporation of Colorado
Filed Apr. 3, 1963, Ser. No. 270,379
3 Claims. (Cl. 55—219)

The present invention relates to a unit designed for placement within a line conveying compressed fluid from a source to its point of consumption, and functioning to separate, filter and accumulate within itself, objectionable solids and liquids usually contained within the fluid.

The object of the invention is to provide automatic means for discharging periodically, the accumulated matter when it reaches a predetermined height within the unit.

Another object of the invention is to provide a unit having automatic means for discharging accumulated matter when the contents of the line is not in use, but still under pressure. That is, when pressure fluid within the line is idle, moisture contained therein will condense and accumulate within the unit, when that accumulation has reached a predetermined height, the automatic means opens the dump valve, when the accumulation has discharged, the dump valve closes.

Heretofore, in units having a float carried valve controlling the flow of operating fluid through an immovable tube to certain automatic means operating the dump valve, it frequently happens that the accumulation of separated matter is insufficient to move the float the necessary distance to fully raise its valve from contact with the tube and admit the required amount of operating fluid to the dump valve operating means. When this occurs both the float and the dump valve are alternately raised and lowered in rapid succession, causing the separated matter to discharge in small dribbles, never sufficient to dump the full contents of the storage chamber.

It is therefore, a further object of the invention to provide a float carried valve which is engageable with a movable tube serving to convey operating fluid to the automatic dumping means, and so designed that upon the slightest separation of the valve and the movable tube an ample supply of fluid, under maximum pressure, will be delivered to the automatic means.

Further objects and advantages of the present invention will hereinafter be apparent, and to all of these ends the invention consists of the features of construction, arrangement of parts, and combination of elements, substantially as described and claimed in the following specification, and illustrated in the accompanying drawings, in which:

FIGURE 1 is a vertical sectional view, partly in elevation, showing the several elements of the invention.

FIGURE 2 is an enlarged vertical sectional view taken along the center line of the automatic means serving to periodically discharge the contents of the storage chamber, and FIGURE 3 is an enlarged detail view showing in section, a portion of the supporting plate for the diaphragm and the elements associated therewith.

Briefly, the invention about to be described is directed to a unit adapted to be positioned within a line conveying compressed fluid from a source to its point of consumption, and functioning to separate and filter from the fluid objectionable solid particles and liquids usually carried thereby. It further includes a receptacle which stores or retains the separated matter until it is periodically discharged by automatic means positioned within the receptacle. This automatic means constitutes the most important and essential feature of the invention. Operation of the automatic means is accomplished by the control of pressurized fluid, from within the receptacle, by a float, the movement of which occurs when the separated matter attains a predetermined height within the receptacle.

To be specific, the discharge valve is normally held closed by pressurized fluid active thereupon, and the release of this holding fluid is controlled by an element, the movement of which is influenced by the admission of pressurized fluid thereupon, through an open ended tube supported by the element. The tube further serves as a guide about which a float rises and falls during the accumulation and discharge of separated matter within the receptacle. The float carries, at its upper end, a valve element engageable with the open end of the tube, controlling the flow of fluid therethrough.

With the structure just described, and assuming that pressure fluid is passing through the unit, and that the discharge valve is held closed by holding fluid active thereupon, when foreign matter has accumulated within the receptacle to a predetermined height, the float moves upwardly of its guiding tube, and the valve carried thereby is moved out of contact with the tube's end, permitting pressure fluid to enter the tube and become active upon the movable element, forcing the same down, and pulling with it the tube. It is obvious that this action draws the open end of the tube further from its close proximity to the float carried valve, insuring a full and ample flow of operating fluid through the tube to the movable element, causing its forcible and sudden engagement with the means for releasing to atmosphere, the holding fluid active upon the discharge valve. When such takes place, the valve opens, by reason of the fact that pressure on its under face is greater than that upon its upper face.

Referring to the drawings in detail, the numeral 5 indicates in general, a complete separator and filter consisting of a tapered cylindrical body 11, opened at both ends, and provided at its larger and upper end with some desirable means for quickly connecting the same to a depending flange 12 of a head 13, the latter having a horizontally disposed inlet 14 and outlet 15, both of which are internally threaded at their outer ends, permitting the unit to be connected, in a compressed fluid conveying line.

The head 13 has formed centrally of its top wall, and depending therefrom, a circular wall 16, that part of which adjacent the inlet 14, serving as an abutment against which the incoming fluid impinges, separating therefrom, to some degree, the objectional foreign matter. The diametrically opposite part of the wall 16 has a passage therethrough which becomes a part of the outlet 15, permitting the uninterrupted flow of fluid from the inlet back to the conveying line.

The under face of the circular wall 16 has a recess which receives, and retains, the edge portion of an inturned flange 17 formed integral with an inverted cone-shaped metallic element 18, the lower portion of which is curved outwardly and upwardly with its peripheral edge bearing firmly against the inner face of the body wall. This outwardly and upwardly curved portion of the member 18 is provided with a series of spaced cuts extending inwardly from its peripheral edge, and at an angle to the center of the member 18, with that portion of the member lying between the cuts bent down to form deflectors and openings 19, causing the in rushing fluid to engage the circular body wall and move centrifugally within the body, further separating therefrom both solid particles and objectionable liquids. It will be apparent that the cone-shaped member 18 acts as a directional guide for the incoming fluid, forcing the same downwardly within the body 11, and causing it to engage the body wall.

Depending from the inner top wall of the casing 13, and centrally within the circular wall 16, is a fixed rod 20, the lower end of which is threaded and receives thereon a thumbpiece or nut 21, molded of some suitable material, and having integral therewith, an outwardly flared skirt 22, the peripheral edge portion of which supports upon its upper face, a tubular filtering element 23, of any desirable material, its upper end being held firmly against the under face of the inturned flange 17, by adjustment of the thumb nut 21. From the drawing, it will be noted that the flared skirt 22, closes completely, the bottom open end of the tubular filtering element 23, thus insuring the flow of fluid through the wall of the filtering element.

The lower portion of the body 11 has formed integral therewith an inwardly projecting flange 24 upon which rests an outwardly extending flange 25 formed at the upper end of a transparent receptacle 26, serving as a storage chamber for the collection of foreign matter removed from the compressed fluid. The receptacle 26 has at its extreme lower end an opening 27, and positioned in that opening and projecting upwardly within the receptacle is the automatic means indicated at 10, for periodically discharging the accumulated matter. To hold the receptacle firmly in its relation to the body 11, there is placed over the open upper end of the receptacle, a plate 28, the central portion of which is convexed while its outer edge rests upon the flange 25. Holding both the plate 28 and the receptacle 26 immovable with relation to the body 11, an annular slot 29 is cut in the inner face of the body wall, just above the plate 28, and fitting within that slot is a snap ring 30. The plate 28 has near its retaining flange, a groove having spaced therein a plurality of openings 31 affording free passage for pressurized fluid and separated matter from the body 11 to the receptacle 26.

From the drawing, it will be noted that when assembling the receptacle with the body, the former is inserted through the open top end of the body and dropped down until its flange 25 rests upon a suitable packing ring positioned upon the flange of the body, the plate 28 is then placed over the receptacle and firmly locked in place by the snap ring 30. The packing ring not only eliminates leakage between the abutting flanges, but affords a yieldable movement of the plate when placing the snap ring in place.

From the foregoing, it is apparent that when the unit is connected within a compressed fluid line, and its use is desired, fluid enters the head 13 through the inlet 14, and impinges upon the depending circular wall 16 and the cone-shaped member 18 where it is directed downwardly of the member and though its openings 19, and by reason of the upstanding flanges adjacent the openings caused to engage the body wall and assume a whirling action within the body. During this movement of the fluid some particles of solid matter and objectionable liquids will be separated therefrom. In addition, other minute particles of solid matter and objectionable liquids will be removed from the fluid as it is directed upwardly by the convexed plate 28 and through the wall of the filtering element 23 to the outlet 15. Objectionable matter thus removed from the compressed fluid will drop upon the convexed plate and find its way through the openings 31 to the interior of the receptacle, where it will accumulate until discharged by the automatic means hereinafter described.

The automatic means generally indicated by the numeral 10 includes a cylindrical casing 32 having a chamber 33, the lower end of the casing is reduced in diameter to form an internally threaded extension 34, which is slipped through the opening 27, of the receptacle, and retained by a nut 35, clamping between its head and the enlarged body of the casing 32 the receptacle. Suitable packing is placed between the adjacent portions of the extension and the clamping nut, preventing leakage therebetween. The clamping nut 35 has formed centrally thereof, a passageway 36 through which matter discharged from the receptacle passes to atmosphere. Surrounding this passageway, in the top end face of the nut, is a valve seat 37 formed of rubber or the like. To permit the flow of collected matter from the receptacle through the discharge passageway 36, the extension 34 has adjacent the casing 32, a series of horizontally disposed openings 38. Placed around the lower end of the casing 32 is a circular screening element 39, the lower edge being receivable within a recess formed in the bottom wall of the receptacle 26. In some usages of the unit it is desirable that the residue discharged from the receptacle be conveyed by a pipe, threadedly connected to the retaining nut 35, to a remote point for disposal—in such cases the screening of the discharge as it leaves the receptacle prevents blockage of the pipe.

The upper end of the cylindrical casing 32 is internally threaded to receive a corresponding portion of a closing cap 40, the under face of which is cupped to provide a chamber 41, surrounded by axially aligned depending flange 42. The inner face of the flange 42 is threaded and screwing therein is the tubular skirt 43 of a member 44, forming a second chamber 41A, having a hexagonal-shaped flange from which depends a tapered projection 45, the end 46, of which is reduced in diameter and receivable within a tubular extension 47 depending from the center of a piston 48, movable up and down within the chamber 33, and maintained in axial alignment therewith by reason of the slidable relation between the end 46 of the tapered projection and the tubular extension 47 of the piston.

The extreme end of the tubular extension 47 constitutes the discharge valve 49, engageable with the seat 37 and controlling the flow of accumulated matter from the receptacle, through the discharge passageway 36 to atmosphere. It will be noted that the valve 49 has centrally of its face an opening 50, the purpose of which will be fully apparent hereinafter. From the above, and as illustrated in the drawing, it will be apparent that the discharge valve 49 is composed of the piston 48 and the tubular extension 47. Both the end of the tapered projection 46 and the piston are provided with packing rings sealing against the possible leakage of pressurized fluid. Also, suitable packing is provided between the abutting hexed portion of the member 49 and the end portion of the flange 42.

Formed centrally in the upper face of the closing cap 40 is a recess 51 receiving therein the end of a vertically positioned tube 52, the upper end of which is opened sufficiently to permit the free passage of pressure fluid from the interior of the receptacle through a port in the lower end of the tube, to a passageway 53 within the cap leading to the interior of the chamber 33, where it impinges upon the upper face of the piston 48 forcing the same down, and closing the valve 49. This condition remains in effect until the holding air active upon the piston is released, in a manner described thereafter. Encircling the tapered projection 45 is a coiled expansion spring 54, one end of which bears against the member 44 while its other end rests upon the piston 48, thus supplying the necessary differential in forces active upon the upper and under faces of the piston urging the valve 49 to a closed position at all times. The tensile strength of the expansion spring is, of course, somewhat less than the force of the pressurized fluid.

Clamped between a depending angular shelf formed in the top wall of the chamber 41 and the inwardly extending end of the tubular extension 43 is a diaphragm 55 made of a synthetic rubber or the like, and of sufficient resiliency to permit reciprocal movement. The central portion of the diaphragm is supported by a circular metallic plate 56 having centrally of its upper face, and projecting through the diaphragm, an upstanding tubular element 57, fitting within the end of a second air tube 58 extending upwardly through the cap 40 and within the first air tube from which it is held in spaced relation with its upper end open and extending beyond that of the first tube. Both the upstanding tubular element 57 and the end of the air tube 58 are provided with aligned openings, see FIGURE 3, through which pressure fluid might pass from the interior of the receptacle 26 into the chamber 41 engaging the upper face of the diaphragm, when the float carried valve described hereafter has moved from its engagement with the tube's open end.

Telescoping the upper ends of both tubes is a float 59, movable in relation to the tubes by the rise and fall of accumulated matter within the receptacle. The float is formed of any desirable material, and has an axial tubular element 60, the upper end of which extends beyond the top face of the float and closed to form a valve 61, the under face of which is engageable with the open end of the tube 58, closing the same when the float is at its lowermost position, preventing the flow of fluid from the receptacle therethrough. Immediately below the closed upper end of the element 60 are several ports 62 for the continuous flow of fluid from the receptacle, through the tube 52 and passageway 53 to the interior of the chamber 33, where it impinges upon the piston 48 holding the valve 49 carried thereby closed.

Formed within the under face of the cap 40, and surrounding the tube 58, is a recess having pressed therein, a retaining ring 63 for suitable packing engageable with the tube preventing leakage thereabout. The retaining ring has on its under face, a number of depending fingers 64, limiting the upward movement of the diaphragm.

The under face of the diaphragm supporting plate 56 has centrally thereof a cup-like projection 65 within which is receivable, when the diaphragm is flexed downward, the end of a depressable stem 66, of an air release poppet valve 67, screwed within a bore 68 formed centrally of an upstanding projection 69 of the member 44. The release valve 67 is identical in structure and operation to that of the ordinary tire valve, wherein the valve element closing the lower end of the casing is moved to an open position upon depressing a spring projected stem, air then flows around the valve element and through the upper open end of the casing.

In the present structure, the air release valve 67 serves to release to atmosphere fluid active upon the piston holding the discharge valve closed. To accomplish this, the bore 68 has in communication therewith, a passageway 70 the other end of which opens into the chamber 33, when the air release valve is opened holding fluid from the chamber 33 passes through the passageway 70, and the valve 67 to the chamber 41A. The chamber 41A is constantly open to atmosphere through a passageway 72, the opening 50 in the face of the discharge valve and through the discharge passageway 36 to atmosphere.

To permit the return of the diaphragm to its normal position after it has been flexed downward to engage the stem of the air release valve 67, the supporting plate for the diaphragm has extending therethrough to the interior of the upstanding element 57 a passageway 71 through which pressure fluid active upon the upper face of the diaphragm may pass into the chamber 41A, and then to atmosphere as described above. The passageways 71 and 72 also permit the escape to atmosphere of any leakage that might occur above the diaphragm. The diaphragm is further assisted in returning to its normal position by a coiled expansion spring positioned between the under face of the supporting plate and the top face of the member 41A, and encircling the projection 69.

In operation, and assuming that the unit has been placed within a closed line conveying compressed fluid from a source to its point of consumption, fluid enters the body 11 through the inlet 14, pressuring both the body and the receptacle.

Prior to pressure fluid entering the receptacle 26, the discharge valve 49 is held closed by the spring 54. Immediately upon fluid entering the receptacle it passes down the tube 52, passageway 53, to the chamber 33, where it impinges upon the piston 48 augmenting the force of the spring holding the valve 49 closed. This combined force of the spring and the fluid is necessary in order to resist the opening of the valve by pressure fluid active on the under face of the piston.

Opening of the line at its point of use causes the fluid to pass from the inlet to the outlet and through certain separating and filtering elements. Foreign matter separated and filtered from the fluid passes through openings 31 in the plate 28 into the receptacle 26 where it is permitted to accumulate until it reaches a predetermined height, whereupon the automatic means is set in operation discharging the collected matter to atmosphere.

Referring now to FIGURE 2 of the drawings, it will be noted that the float 59 is in its lowermost positon with the valve 61 carried thereby resting upon the open end of the tube 58 preventing the flow of fluid therethrough. When the accumulated matter within the receptacle reaches a predetermined height, the float 59 is raised, opening the tube 58 and permitting fluid to bear upon the diaphragm 55, whereupon the diaphragm is depressed withdrawing the end of the tube 58 away from its close proximity to the float carried valve. As a result, a surge of pressure fluid, at its full force, bears upon the diaphragm giving it a sudden or snap action causing forcible contact with the valve stem 66 of the air release valve 67 depressing the same and opening the air release valve so that fluid active upon the piston 48 holding the discharge valve 49 closed may escape to atmosphere by way of the chamber 41A and passageway 72. When this occurs, the discharge valve opens, and the collected matter within the recepatcle is dumped through the discharge passageway 36.

The discharge valve remains open as long as the diaphragm is in forcible contact with the stem of the air release valve, and this period is regulated by the rate of escape of the fluid active upon the upper face of the diaphragm to atmosphere. The rate of escape is obviously controlled by the size of the opening 72. When this holding fluid active upon the diaphragm has exhausted to atmosphere sufficiently to break contact between the diapragm and valve stem, the air release valve closes and pressure fluid entering the chamber 33 through the tube 52 bears upon the piston and forces the discharge valve closed.

Although the present invention has been described in connection with its preferred embodiment, it is to be understood that modifications and variations may be resorted to without departing from the spirit and scope of the invention, as those skilled in the art will readily understand. Such modifications and variations are considered to be within the purview and scope of the invention and appended claims.

We claim:

1. A filter for removing water from air flowing through a compressed air line including:
   (a) a head having a passageway for air under pressure and means for removing water therefrom;
   (b) a receptacle connected to the head and in open communication therewith forming a trap for the separated water;
   (c) a casing within the receptacle pressurized from the receptacle and having an outlet to atmosphere for the collected water;
   (d) a discharge valve within the casing controlling the flow of water through the outlet;
   (e) said valve having upper and under faces engageable by pressure counterbalancing the same;
   (f) expansion means within the casing active upon the upper face of said valve constantly urging the same to a closed position;
   (g) a diaphragm within the casing forming one wall of an air chamber;
   (h) a tubular member fixed to the diaphragm and having an open upper end and openings communicating with the air chamber;
   (k) a poppet valve below the diaphragm having an operating stem for releasing to atmosphere pressure active upon the upper face of the discharge valve unbalancing the same for movement to its open position;

(m) a float movable on the tubular member upon the rise and fall of water within the receptacle;

(n) said float having a valve engageable with the open end of the tubular member controlling the flow of air therethrough to said air chamber to actuate said diaphragm;

(o) and said diaphragm when so actuated engaging the stem of the poppet valve releasing air active upon the upper face of the discharge valve unbalancing the same for movement to an open position and the discharge of trapped water to atmosphere.

2. A filter for removing objectionable liquids from compressed fluid flowing through a service line, including:

(a) a head having a passageway for the fluid and means for removing liquids therefrom;

(b) a receptacle connected to the head and in open communication with the passageway forming a trap for the separated liquids;

(c) a casing within the receptacle pressurized therefrom and having an outlet for the discharge of liquids;

(d) a valve within the casing for opening and closing said outlet;

(e) said valve having opposed areas engageable by pressure counterbalancing the same;

(f) means within the casing exerting a lesser pressure upon the valve constantly urging the same to a closed position;

(g) a yieldable element within the casing forming one wall of an air chamber;

(h) a tubular member fixed to the yieldable element and serving to convey pressure fluid from the receptacle to the air chamber;

(k) a poppet valve adjacent the yieldable element, and having an operating stem engageable by said element;

(m) a float movable relative to the tubular member upon the rise and fall of liquids within the receptacle;

(n) control means carried by the float and engageable with the open end of the tubular member opening and closing the same for the passage of pressure from the receptacle to the air chamber expanding said yieldable element;

(o) and said yieldable element when so expanded engaging the stem of the poppet valve opening the same for the release of pressure active upon one area of the first said valve unbalancing the same for movement to an open position and the discharge of trapped liquids from the receptacle.

3. A filter positioned within a compressed air line for separating liquids from the air flowing therethrough including:

(a) a head having an air passageway and means for removing liquids from the air;

(b) a receptacle connected to the head collecting therein the separated liquids;

(c) a casing within the receptacle having an outlet through which liquids from the receptacle are discharged to atmosphere;

(d) a discharge valve within the casing adapted to open and close the outlet;

(e) said valve having upper and under faces engageable by pressure counterbalancing the same;

(f) expansion means within the casing constantly urging said valve to a closed position;

(g) a diaphragm within the casing dividing a portion thereof into upper and lower air chambers;

(h) a tubular member fixed to said diaphragm and movable therewith;

(k) said tubular member having an open end and passages communicating with the upper chamber;

(m) a poppet valve within the lower chamber having an operating stem adjacent said diaphragm for releasing to atmosphere pressure active upon the upper face of said discharge valve unbalancing the same for movement to open position;

(n) a float movable on the tubular member upon the rise and fall of liquids within the receptacle;

(p) a valve carried by the float controlling the admission of air through the tubular member to the upper chamber expanding said diaphragm into contact with the operating stem of said poppet valve;

(q) and said diaphragm when initially expanded withdrawing the open end of said tubular member further from the float valve for the admission of a greater volume of air into the upper chamber causing a continued and forcible expansion of the diaphragm and contact with the operating stem of the poppet valve.

References Cited by the Examiner

UNITED STATES PATENTS

| 1,529,334 | 3/1925 | Winkeleer | 137—204 |
| 1,738,809 | 12/1929 | Walter | 137—194 X |
| 1,784,664 | 12/1930 | Eickholt | 55—219 |
| 2,393,119 | 1/1946 | Paasche | 55—278 |
| 2,629,458 | 2/1953 | Allen et al. | 55—219 |
| 2,663,121 | 12/1953 | Ramsey | 251—25 |
| 2,692,026 | 10/1954 | Frantz | 55—218 |
| 2,726,732 | 12/1955 | Faust et al. | 55—219 |
| 2,746,476 | 5/1956 | Dopkeen | 137—204 |
| 2,866,519 | 12/1958 | Hazlett et al. | 55—218 |

FOREIGN PATENTS 759,400  10/1956  Great Britain.

HARRY B. THORNTON, *Primary Examiner.*

D. TALBERT, L. H. McCARTER, *Assistant Examiners.*